United States Patent [19]

Dahlmann

[11] Patent Number: 4,971,290

[45] Date of Patent: Nov. 20, 1990

[54] INJECTION CONTROL VALVE FOR A FUEL INJECTION SYSTEM IN AN INTERNAL COMBUSTION ENGINE

[75] Inventor: Gerd-Uwe Dahlmann, Brunswick, Fed. Rep. of Germany

[73] Assignee: Volkswagen AG, Fed. Rep. of Germany

[21] Appl. No.: 431,382

[22] Filed: Nov. 2, 1989

[30] Foreign Application Priority Data

Nov. 4, 1988 [DE] Fed. Rep. of Germany ....... 3837409

[51] Int. Cl.[5] ............................................ F16K 31/06

[52] U.S. Cl. .......................... 251/129.15; 251/129.06; 123/506

[58] Field of Search ........... 251/129.19, 129.6, 129.15; 123/506; 137/625.65

[56] References Cited

U.S. PATENT DOCUMENTS 4,176,822 12/1979 Chadwick .................. 137/625.65 X 4,750,514 6/1988 Omori et al. ............... 251/129.19 X

FOREIGN PATENT DOCUMENTS 3511492 10/1986 Fed. Rep. of Germany .

*Primary Examiner*—Arnold Rosenthal

*Attorney, Agent, or Firm*—Brumbaugh, Graves, Donohue & Raymond

[57] ABSTRACT

In the embodiments of an injection control valve for the fuel injection of an internal combustion engine described in the specification, an electric actuating device controls a pilot valve which has a sealing surface cooperating with a sealing surface on a valve member in the region of a compression chamber which communicates with a fuel injection pump. Separation of the pilot valve from the valve member when permitted by the actuating device produces a gap between the sealing surfaces so that those sealing surfaces are exposed to the pressure of the fuel in the compression chamber. The fuel pressure acts on the exposed surfaces to enlarge the gap between them, thereby opening a pressure-relieving outlet from the compression chamber.

9 Claims, 9 Drawing Sheets

INJECTION CONTROL VALVE FOR A FUEL INJECTION SYSTEM IN AN INTERNAL COMBUSTION ENGINE

BACKGROUND OF THE INVENTION

This invention relates to injection control valves for fuel injection systems in internal combustion engines and, more particularly, to new and improved injection control valves which provide more effective operation of a fuel injection system.

In German Offenlegungsschrift No. 35 11 492, an injection control valve for a fuel injection system has an electromagnetic or piezoelectric actuating device arranged to move a valve-closing member axially into a position in which it opens a connection between a compression chamber and another chamber when actuated, and a compression spring moves the valve-closing member to close the connection when the device is deactivated. To minimize the force required for the actuating device to move the valve-closing member into the position opening the connection and the spring force required to move the valve-closing member into its closed position, the valve-closing member and its valve seat are designed so that the valve-closing member has no surface exposed to the fuel pressure in the opening and closing direction when the connection is closed. Immediately after the valve-closing member is separated from its seat, however, it exposes those surfaces so that the force applied by the actuating device is supplemented by the fuel pressure in the compression chamber which is in communication with a working chamber of the fuel pump.

Such injection control valves provide the advantage that the fuel injection process can be completed even before the end of the working stroke of the fuel pump piston by reducing the fuel pressure in the compression chamber which is in communication with the fuel injection valve of the internal combustion engine. Further closing of the valve, i.e., movement of its valve-closing member into the position closing the connection between the compression chamber and the other chamber, is effected by the associated compression spring upon deactivation of the actuating device after the end of the working stroke of the pump piston, i.e., after the end of the delivery stroke of the pump.

SUMMARY OF THE INVENTION

Accordingly, it is an object of the present invention to provide an injection control valve for a fuel injection system which overcomes the disadvantages of the prior art systems.

Another object of the invention is to provide an injection control valve for a fuel injection system which makes it possible to initiate and to end the fuel injection processes, i.e., to control the start and the duration of fuel injection, rapidly and with highly accurate timing.

These and other objects of the invention are attained by providing a fuel injection control valve including a spring-biased valve member having a sealing surface and a pilot valve member movable by an actuating device and having a sealing surface mating with the valve member sealing surface so that when the sealing surfaces are engaged no moving force is applied to the valve member by fuel pressure and when actuation of the pilot valve produces a gap between the sealing surfaces, fuel pressure moves the valve member to the open position against the bias of the spring. Thus, in a control valve arranged according to the invention, the movement of the valve member is effected solely by the pressure of the fuel in the compression chamber, and the actuating device serves only to separate the sealing surface of the pilot valve from the associated sealing surface on the valve member so that the valve member sealing surface is freely accessible to respond to the pressure exerted by the fuel. This results in three essential advantages: (1) the length of travel of the actuating device, which may be an electromagnetic or piezoelectric device, can be kept very short; (2) the masses of the elements to be moved by the actuating device can similarly be kept very small; and (3) the restoring forces required for the parts moved are also small. These three advantages of the invention result in a short response time and high switching speeds of the injection control valve.

As may be seen in the detailed description of examples hereinafter, a control valve arranged according to the invention operates in such manner that, for example, excitation of the actuating device results in closing a pressure chamber which is in communication with the fuel injection pump so that a high pressure is built up in the system, which leads to opening of the fuel injection valves and hence to the beginning of fuel injection. Excitation of the actuating device thus establishes the beginning of fuel injection. To interrupt or terminate the fuel injection process, the actuating device is deactivated, causing the pilot valve surface to be separated from the sealing surface of the valve member by a restoring spring, thereby diverting the fuel to an outlet, resulting in a pressure drop in the compression chamber and thus in the high-pressure system of the fuel injection unit in, so to speak, two brief consecutive steps. That is, first the lifting motion of the pilot valve produces a relatively small gap between the sealing surfaces of the pilot valve and of the valve member. As a result, the pressure of the fuel acts on the exposed sealing surface of the valve member causing the valve member to move so that the gap between the sealing surfaces, and hence the cross-section of flow for the fuel, is enlarged. This results in a substantial reduction of the fuel pressure in the whole system, so that the fuel injection valves are closed.

Since, as stated above, all of the movable parts of the injection control valve and their travel, as well as their associated restoring springs, may be kept small, the control signals supplied to the electric actuating device are converted rapidly with precise timing into motions of the movable parts of the injection control valve, so that injection processes are produced with a high degree of temporal accuracy.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
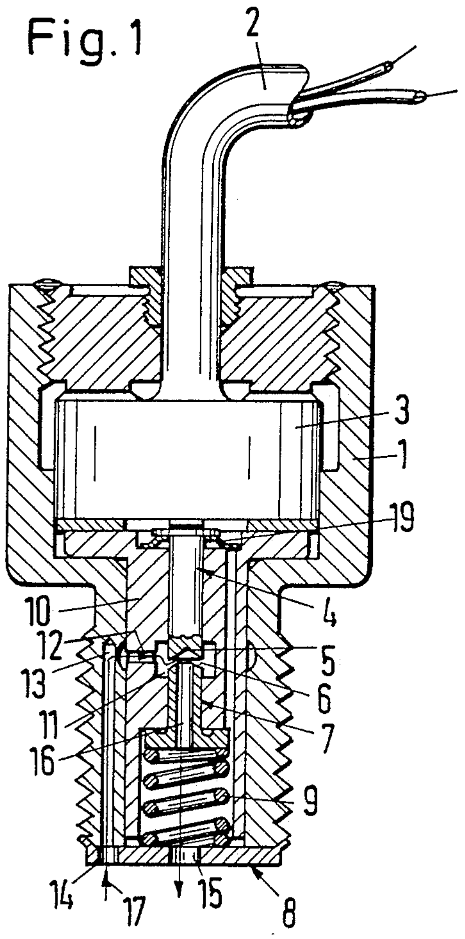
FIGS. 1 to 4 are axial sectional views taken through a representative control valve according to the invention illustrating the position of the valve components in various operating conditions.

In the typical embodiment of the invention represented in FIGS. 1 to 4, a fuel injection control valve includes a housing 1 enclosing an electromagnetic actuating device 3 which receives actuating signals through an electrical cable 2. The actuating device 3 is axially aligned with a pilot valve member 4 which is preloaded by a disc spring 19 toward a projecting actuating element on the actuating device 3. At its opposite end, the pilot valve member is formed with a valve seat 5 which mates with a valve surface 6 on a valve member 7 to form a sealing engagement therewith. A compression spring 9, which engages a cover for the housing 1, acts as a restoring spring for the valve member 7. Surrounding the region of engagement of the valve seat 5 and the sealing surface 6 is a compression chamber 11 which is formed within a valve bushing 10. Two connected channels 12 and 13 provide communication between the compression chamber 11 and the high-pressure chamber of the fuel pump (not shown) of the fuel injection system with which the control valve is associated. Since such fuel pumps are well-known and of conventional design, the fuel pump is not described or illustrated. The housing cover 8 has a hole 14 aligned with the channel 13 and another hole 15 providing a discharge opening.

Figure 4:
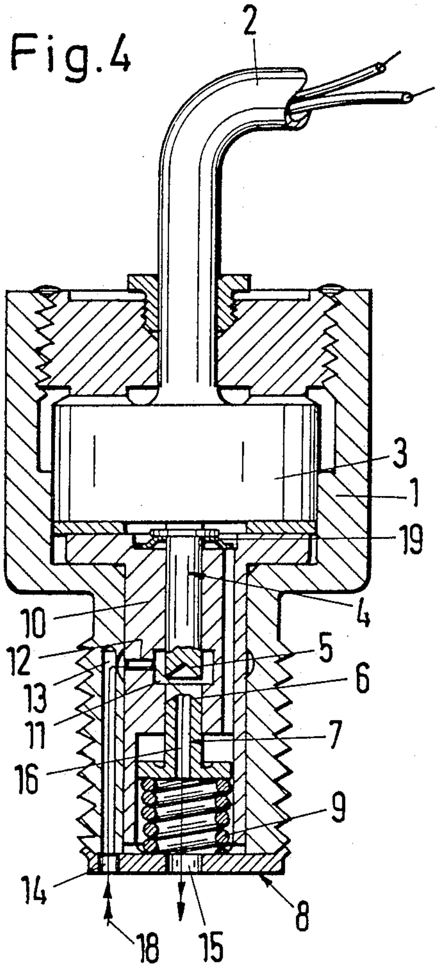

In the embodiment of FIGS. 1 14 4, the valve member 7 has an axial channel 16 which allows fuel delivered by the fuel pump to the passage 13 to run back into the pump or to a fuel tank through the outlet opening 15 when the pilot valve seat 5 and the sealing surface 6 are separated, as shown by the flow lines 17.

Figure 2:
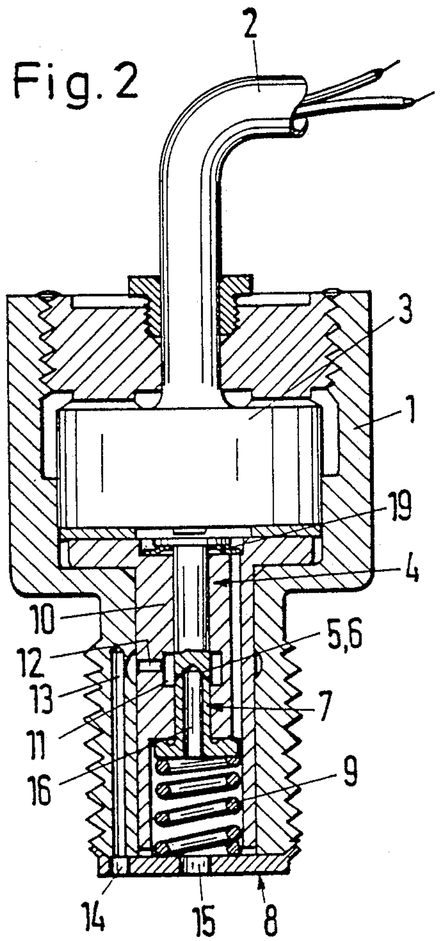

FIG. 1 shows the positions of the components of the injection control valve in the condition when the actuating device 3 is not energized. If a fuel injection cycle is to be initiated by an increase in the fuel pressure in the system, actuating signals are supplied via the cable 2 to the actuating device 3 from an engine control computer, for example. These signals energize the actuating device 3, causing the pilot valve 4 to be moved against the force of the disc spring 19 toward the sealing surface 6 of the valve member 7, that is, in the downward direction of FIG. 2. When the surface 5 engages the facing sealing surface 6 of the valve member 7, the flow connection between the compression chamber 6 and the axial channel 16, and hence the discharge opening 15, is closed. Because the gap between the facing surfaces 5 and 6 in the unactivated condition was very small as shown in FIG. 1, the pilot valve 4 requires only a short motion to close that gap, so that the actuating device 3 need be designed to provide only this short motion, but nevertheless is capable of completing the pilot valve motion very rapidly. In the closed position of the pilot valve 4 and valve member 7 shown in FIG. 2, these members are not exposed to any pressure urging them to move away from each other since they have no surfaces exposed in an axial direction to the fuel pressure in the compression chamber 6. Because the high-pressure flow passage is shut off in the operating phase as shown in FIG. 2, the fuel pump in the fuel injection system causes a rapid build-up of high pressure, which results in actuation of the injection valve of the fuel injection system which also is not illustrated because it has a well-known conventional structure.

Figure 3:
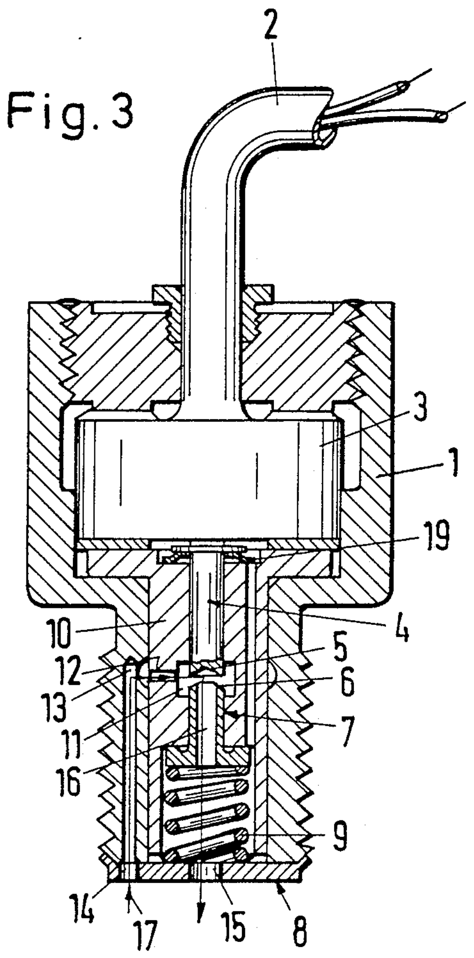

To end the fuel injection cycle, excitation of the actuating device 3 is terminated and the disc spring 19 moves the pilot valve against the projecting surface of the actuating device 3 as shown in FIG. 3. As a result, the valve seat 5 is again separated from the sealing surface 6 so that the conditions previously explained with respect to FIG. 1 are again present, thereby providing a pressure-relieving flow 17 of fuel through the valve 7.

It should be noted that the separation of the surface 5 of the pilot valve 4 from the sealing surface 6 of the valve member 7 not only permits the fuel pressure in the compression chamber 6 to act on the pilot valve seat 5 to increase the gap between those surfaces, but also permits the fuel pressure to act on the sealing surface 6 to urge it in the downward direction of FIG. 3 so as to displace the valve member 7 downwardly as shown in FIG. 4 against the force of the compression spring 9 which is designed to be relatively weak. This causes the gap between the opposed surfaces 5 and 6 to be substantially enlarged so that the cross-section of fuel flow is substantially increased, resulting in a strong fuel flow, indicated by the double arrows 18, through the discharge opening 15. The associated pressure reduction in the high-pressure lines of the fuel injection system terminates the fuel injection cycle. As a result of this pressure reduction, the compression spring 9 overcomes the reduced force exerted by the fuel on the surface 6 of the valve member 7 and, consequently, the valve member is returned to the starting position shown in FIGS. 1, 2 and 3, in which a flange at the lower end of the valve engages a surface of the valve bushing 10.

Figure 5:
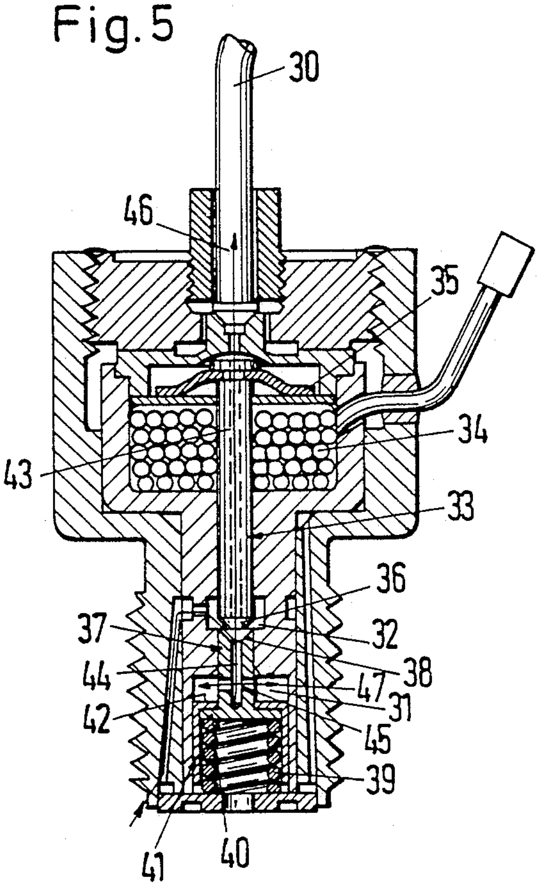
FIG. 5 is an axial sectional view through a second embodiment of a control valve according to the invention.

In the example just described and shown in FIGS. 1 to 4, the pressure reduction in the high-pressure line of the fuel injection system after the valve is opened is effected by flow of fuel through a discharge opening. In another embodiment, shown in FIG. 5, relief of the fuel line pressure is accomplished both by discharge through a diversion line and by escape of fuel from the pressure chamber into a collection chamber. As illustrated in FIG. 5, this embodiment has a diversion line 30 along with a collection chamber 31 which provides a time-controlled increase in the volume of the compression chamber 32.

The embodiment of FIG. 5 also includes a pilot valve 33 which, in this example, passes through an actuating device 34, which is represented by a winding, and is supported at its upper end as viewed in the figure by a disc spring 35. At its lower end, the pilot valve is formed with a valve seat 36 which engages a mating surface 38 in a valve member 37 to form a sealing engagement. A compression spring 39 extends between a disc-shaped enlargement of the valve member 37 and a cover plate and is enclosed in a hollow piston 41, having a collar 42 which extends behind the disc-shaped enlargement 40. The provision of the hollow piston 41 permits simplified manufacture of the valve member 37.

The pilot valve 33 and the valve member 37 both have axial channels 43 and 44, respectively. The axial channel 43 provides a connection between the compression chamber 32 and the diversion line 30 when the mating surfaces 36 and 38 are separated, while the axial channel 44, together with two transverse channels 45, provides a connection between the compression chamber 32 and the collection chamber 31 when the valve member 37 is moved downwardly as shown in FIG. 5.

In the positions of the various movable components of the control valve shown in FIG. 5, there is a relatively large gap between the opposed surfaces 36 and 38. Therefore, fuel is able to flow from the compression chamber 32 through the channel 33 in the pilot valve and, accordingly, from the high-pressure line of the fuel injection system to the diversion line 30 as shown by the flow line 46 as well as through the channel 44 in the valve member 37 to the collection chamber 31 as shown by the flow lines 47. Consequently, a reduction in pressure is produced by the addition of the volume of the collection chamber 31 to the volume of the compression chamber 32 as well as by continuous removal of fuel through the diversion line 30.

In this case as in the embodiment of FIGS. 1-4, the pilot valve 33 and the valve member 45 are moved apart after the surfaces 36 and 38 have been separated by the compressive forces exerted on those surfaces by the fuel in the compression chamber 32 so that the spring 35 only needs to lift the surface 36 of the pilot valve 33 slightly from the sealing surface 38 of the valve member 37 when the activating device 34 is deenergized.

As soon as the pressure in the high-pressure line of the fuel injection system has dropped sufficiently as a result of the flow through the diversion line 30 and filling of the collection chamber 31, the fuel injection valves are closed. In addition, the spring 39 moves the hollow piston 41 upwardly to force the fuel which had moved into the collection chamber 31 back into the compression chamber 32 through the holes 44 and 45. After the piston 41 has moved upwardly far enough to close the channels 45, the fuel remaining in the collection chamber 31 acts as a buffer to prevent hard impact of the piston collar 42 against the opposed wall of the housing.

Figure 6:
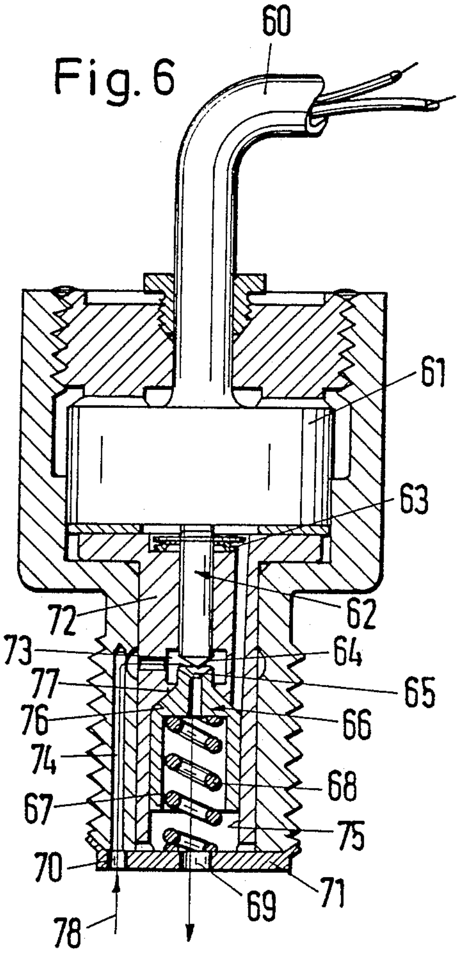
FIGS. 6, 7 and 8 are axial sectional views taken through a third embodiment in accordance with the invention illustrating the valve components in various operating conditions.
Figure 7:
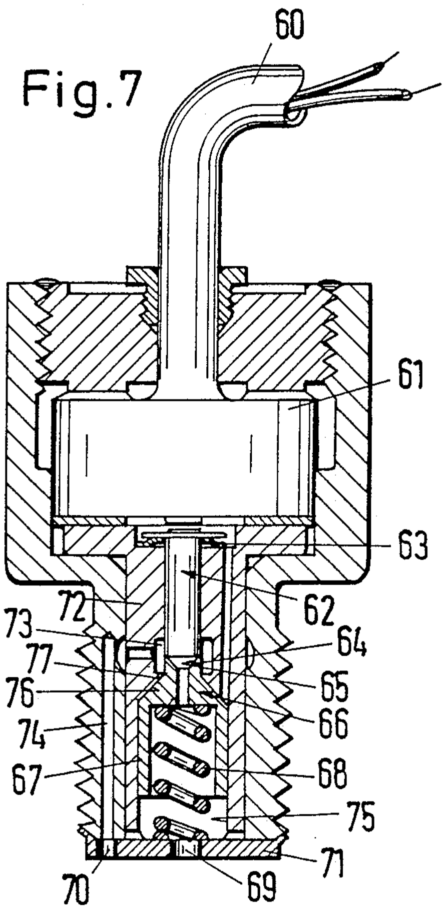
Figure 8:
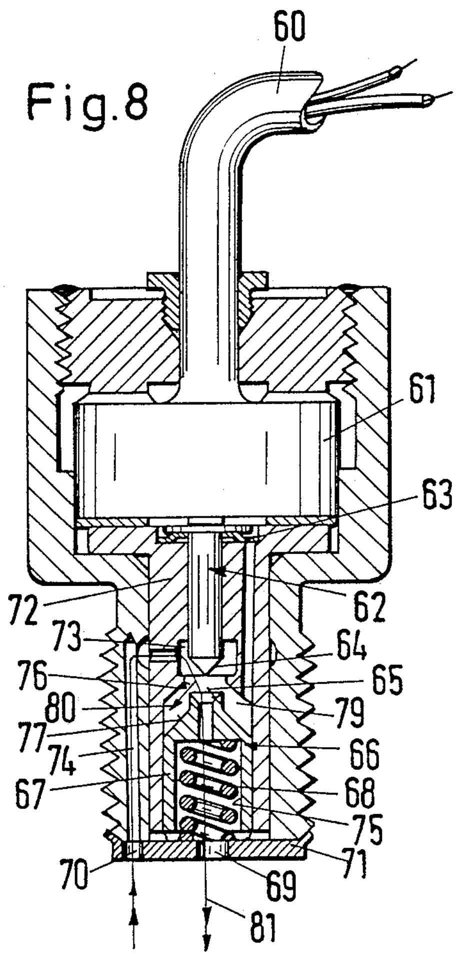

A third embodiment of the invention, shown in FIGS. 6, 7 and 8, also has a fuel diversion line as well as an additional collection chamber. Referring first to FIG. 6, this embodiment includes an electric actuating device 61 supplied with control signals through a control cable 60 for electromagnetic actuation of a pilot valve 62, which is preloaded by a disc spring 63 in the upward direction as seen in the figure. The lower end of the pilot valve is formed as a valve seat 64 which opposes a sealing surface 65 of a valve member 66. The valve member has a downward extension 67 forming a valve chamber which is open toward the bottom to receive a compression spring 68. The lower end of the compression spring engages a cover 71 provided with a discharge opening 69 and an inlet opening 70. This embodiment also includes a compression chamber 73, formed in a valve bushing 72, which is connected through a line 74 and the inlet opening 70 to the high-pressure fuel line from the fuel pump in the fuel injection system (not shown).

In the condition illustrated in FIG. 6, the actuating device 61 is not excited and there is a gap between the opposed surfaces 64 and 65, permitting fuel to flow from the inlet opening 70 to the discharge opening 69 as indicated by the line 78 so as to refill and scavenge the high-pressure fuel lines in the system. On the other hand, if the actuating device 61 is energized, the pilot valve 62 is moved downward as shown in FIG. 7 to close the gap between the surfaces 64 and 65, so that passage of fuel between them is prevented. The fuel flow indicated by the line 78 in FIG. 6 is thus terminated, closing the outlet from the high-pressure line of the fuel injection system and, as a result of the rise of pressure in the high-pressure line, the fuel injection process is started.

When the actuating device 61 is de-energized, the disc spring 63 moves the pilot valve 62 upwardly as shown in FIG. 8, and the fuel pressure in the compression chamber 73 substantially accelerates movement of the pilot valve in the upward direction. In addition, the fuel pressure moves the valve member 66 downwardly as seen in the figure, so that two conical surfaces 76 and 77 on the housing and the valve have moved apart and a collection chamber 79 is formed between them. As a result, a rapid pressure reduction occurs in the high-pressure line of the fuel injection system because of the flow of fuel into the collection chamber 79 as shown by the line 80 and the flow of fuel through the valve member 66 and the discharge opening 69 as shown by the line 81. This reduction in pressure permits return of the valve member 66 to its original position in response to the force of the compression spring 68. During this upward motion, the valve member presses the volume of fuel contained in the collection chamber 79 back into the compression chamber 73, until the conical surfaces 76 and 77 are again in contact.

Figure 9:
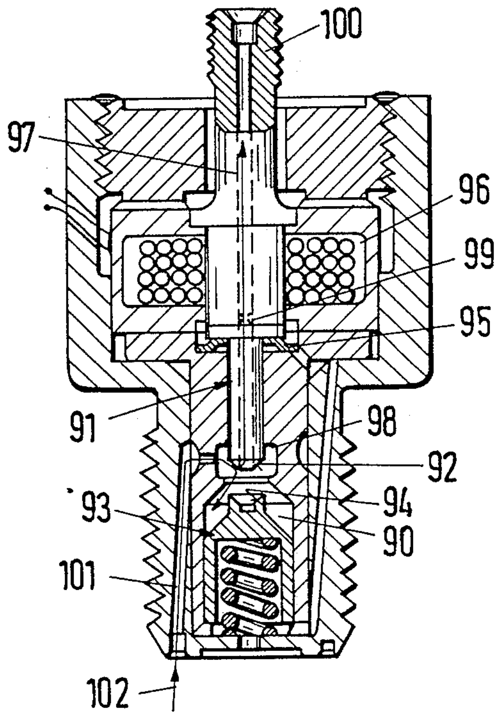
FIG. 9 is an axial sectional view taken through a fourth embodiment of a control valve according to the invention.

The embodiment shown in FIG. 9 forms a collection chamber 90 in the same way as the embodiment of FIGS. 6 to 8, and the flow of fuel from the inlet through the compression chamber and into the collection chamber is shown by the line 102. As in the other embodiments, a pilot valve 91 has a valve seat 92 and a valve member 93 has a mating sealing surface 94. Also, a disc spring 95 for restoring the pilot valve 91 is below an actuating device 96 as shown in the figure. The pilot valve 91 has an axial channel 97, which opens into the sealing seat 92 and thus, when there is a gap between the surfaces 92 and 94, the channel 92 communicates with a compression chamber 98. The axial channel 97 is provided with a throttle 99, so that it does not contribute significantly to the pressure decrease in the compression chamber 98. In this example, the axial channel 97 provides a connection between the compression chamber 98 and a fuel connection 100 for the valve, so that the quantity of fuel injected during an injection process is delivered to the pump through the axial channel 97 and an inlet channel 101.

The invention accordingly provides an injection control valve for a fuel injection system which requires only small masses to be moved and utilizes fuel pressure to move them, so that a relatively weak actuating device can be used while providing rapid and accurately timed operation so as to provide precise control of the fuel injection process.

Although the invention has been described herein with reference to specific embodiments, many modifications and variations therein will readily occur to those skilled in the art. Accordingly, all such variations and modifications are included within the intended scope of the invention.

I claim:

1. A control valve for a fuel injection system in an internal combustion engine comprising pilot valve means axially displaceable between two positions, electric actuating means and first spring means for axially displacing the pilot valve means, second valve means axially displaceable with respect to the pilot valve means, sealing surface means having sealing surfaces on adjacent portions of the pilot valve means and the second valve means, said sealing surfaces cooperating to form a seal when the electric actuating means is conditioned for displacement of the pilot valve means toward the second valve means, second spring means for urging the second valve means toward the pilot valve means, pressure chamber means adjacent to the sealing surface means, outlet means for releasing pressure from the pressure chamber means when the cooperating sealing surfaces are disengaged, the pilot valve means and the second valve means having no unopposed surfaces exposed to fuel pressure in the axial direction when the sealing surfaces are engaged so that the pressure in the pressure chamber means is ineffective to apply force to either of them in the axial direction, wherein conditioning of the actuating means for displacement of the pilot valve mans so as to separate the sealing surfaces permits application of pressure in the pressure chamber means to the sealing surfaces so as to apply axial force to the pilot valve means and the second valve means to increase the separation between the sealing surfaces and connect the pressure chamber means with the outlet means.

2. A control valve according to claim 1 including means forming a diversion channel in one of the pilot valve means and the second valve means to provide communication between the pressure chamber means and the outlet means when the sealing surfaces are separated.

3. A control valve according to claim 1 including means forming a collection chamber and wherein the second valve means includes means providing communication between the pressure chamber means and the collection chamber means in one position of the second valve means.

4. A control valve according to claim 3 wherein the second valve means is formed with a surface opposed to a stationary surface and urged against the stationary surface by the second spring means.

5. A control valve according to claim 3 wherein the second valve means includes an axial channel opening into the sealing surface of the second valve means and transverse channel means connected to the axial channel and communicating with the collection chamber means in said one position of the second valve means.

6. A control valve according to claim 4 including a housing for the control valve and wherein the outlet means includes a stationary channel in the housing containing the second valve means and wherein the stationary surface is a housing surface engaged by the opposed surface of the second valve means when the second valve means is at one end of the stationary channel.

7. A control valve according to claim 1 wherein the second valve means is formed with a chamber which is open at one end to receive the second spring means.

8. A control valve according to claim 1 including a hollow piston axially aligned with the second valve means and wherein the second spring means is disposed within the hollow piston.

9. A control valve according to claim 1 wherein the pilot valve means includes an axial channel opening at one end into the sealing surface of the pilot valve means and communicating at the other end with a fuel connection for the control valve and including throttle means in the axial channel.

* * * * *